United States Patent
Liu

(10) Patent No.: US 12,111,742 B2
(45) Date of Patent: Oct. 8, 2024

(54) METHOD FOR LOG RECORDING, ELECTRONIC DEVICE AND NON-TRANSITORY COMPUTER-READABLE STORAGE MEDIUM

(71) Applicant: SUZHOU METABRAIN INTELLIGENT TECHNOLOGY CO., LTD., Jiangsu (CN)

(72) Inventor: Guohua Liu, Jiangsu (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/692,281

(22) PCT Filed: Sep. 29, 2022

(86) PCT No.: PCT/CN2022/122868
§ 371 (c)(1),
(2) Date: Mar. 14, 2024

(87) PCT Pub. No.: WO2023/071701
PCT Pub. Date: May 4, 2023

(65) Prior Publication Data
US 2024/0264918 A1    Aug. 8, 2024

(30) Foreign Application Priority Data
Oct. 26, 2021   (CN) .......................... 202111251548.X

(51) Int. Cl.
*G06F 11/00*    (2006.01)
*G06F 1/30*    (2006.01)
(Continued)

(52) U.S. Cl.
CPC ............ *G06F 11/3034* (2013.01); *G06F 1/30* (2013.01); *G06F 11/2015* (2013.01); *G06F 11/3065* (2013.01)

(58) Field of Classification Search
CPC ............. G06F 11/2015; G06F 11/3034; G06F 11/3065; G06F 1/30
See application file for complete search history.

(56) References Cited

U.S. PATENT DOCUMENTS 10,789,130 B1 * 9/2020 Horspool ............ G06F 11/1441
10,839,862 B2 * 11/2020 McGlaughlin ....... G11C 13/004
(Continued)

FOREIGN PATENT DOCUMENTS

CN          101339806 A     1/2009
CN          201788502 U     4/2011
(Continued)

*Primary Examiner* — Elmira Mehrmanesh
(74) *Attorney, Agent, or Firm* — IPro, PLLC

(57) ABSTRACT

A method and an apparatus for log recording, and an electronic device are provided. The method is applied to a storage device, wherein a storage space of the storage device is configured to be at least two storage areas, and the at least two storage areas includes at least one first storage area for storing data by using a serial writing mode and at least one second storage area for storing the data by using a parallel writing mode, the method includes: monitoring an operating state of a system of the storage device; when the operating state of the system of the storage device is normal, storing generated log data in the first storage area.

18 Claims, 1 Drawing Sheet

---

101 — monitoring an operating state of a system of the storage device

102 — when the operating state of the system of the storage device is normal, storing generated log data in the first storage area 103 — when the system of the storage device is abnormally powered off, switching an emergency power supply to supply power for the storage device and controlling a log data storage operation of the second storage area in response to abnormal power-off

(51) Int. Cl.
  *G06F 11/20*   (2006.01)
  *G06F 11/30*   (2006.01)

(56) References Cited

U.S. PATENT DOCUMENTS

| | | | |
|---|---|---|---|
| 10,866,889 B2* | 12/2020 | Lee | G06F 3/0689 |
| 2011/0093650 A1* | 4/2011 | Kwon | G11C 16/225 |
| | | | 711/E12.001 |
| 2017/0060706 A1* | 3/2017 | Kinoshita | G06F 11/1666 |
| 2017/0220274 A1* | 8/2017 | Park | G06F 11/1451 |
| 2017/0315889 A1* | 11/2017 | Delaney | G06F 11/1441 |
| 2018/0089081 A1* | 3/2018 | Ramalingam | G11C 16/10 |
| 2018/0261281 A1* | 9/2018 | Moschiano | G11C 16/0483 |
| 2019/0155792 A1 | 5/2019 | Jeong et al. | |
| 2020/0004675 A1* | 1/2020 | Park | G06F 12/0246 |

FOREIGN PATENT DOCUMENTS

| | | |
|---|---|---|
| CN | 108874312 A | 11/2018 |
| CN | 109491818 A | 3/2019 |
| CN | 110515544 A | 11/2019 |
| CN | 110890113 A | 3/2020 |
| CN | 114168401 A | 3/2022 |

\* cited by examiner

METHOD FOR LOG RECORDING, ELECTRONIC DEVICE AND NON-TRANSITORY COMPUTER-READABLE STORAGE MEDIUM

CROSS-REFERENCES TO RELATED APPLICATIONS

The present disclosure claims the priority of the Chinese patent application filed on Oct. 26, 2021 before the China National Intellectual Property Administration with the application number of 202111251548.X and the title of "LOG RECORDING METHOD AND APPARATUS, AND ELECTRONIC DEVICE", which is incorporated herein in its entirety by reference.

TECHNICAL FIELD

The present disclosure relates to the technical field of data storage and, more particular, to a method and an apparatus for log recording, and an electronic device.

BACKGROUND

A SSD (Solid State Disk) with a non-volatile memory express (NVMe) protocol interface is now increasingly widely used in enterprise and consumer-grade storage devices because of its good performance of high bandwidth and low latency compared with traditional disks. As an embedded device, a SSD in-disk system with the NVMe protocol interface needs a function of log recording, so that maintenance personnel obtain or view device logs to analyze causes of problems in a scenario where the problems need to be located.

SUMMARY

A method for log recording is provided in an embodiment of the present disclosure, which is applied to a storage device. A storage space of the storage device is configured to be at least two storage areas, and the at least two storage areas include at least one first storage area for storing data by using a serial writing mode and at least one second storage area for storing the data by using a parallel writing mode. The method includes: monitoring an operating state of a system of the storage device: when the operating state of the system of the storage device is normal, storing generated log data in the first storage area; and when the system of the storage device is abnormally powered off, switching an emergency power supply to supply power for the storage device and controlling a log data storage operation of the second storage area in response to abnormal power-off.

An apparatus for log recording is provided in an embodiment of the present disclosure, which is applied to a storage device. A storage space of the storage device is configured to be at least two storage areas, and the at least two storage areas include at least one first storage area for storing data by using a serial writing mode and at least one second storage area for storing the data by using a parallel writing mode. The apparatus includes: a monitoring module configured for monitoring an operating state of a system of the storage device: a first storage module configured for when the operating state of the system of the storage device is normal, storing generated log data in the first storage area; and a second storage module configured for when the system of the storage device is abnormally powered off, switching an emergency power supply to supply power for the storage device and controlling a log data storage operation of the second storage area in response to abnormal power-off.

An electronic device is further provided in an embodiment of the present disclosure, the electronic device includes a memory and one or more processors, a computer-readable instruction is stored in the memory, and the computer-readable instruction, when executed by the one or more processors, causes the one or more processors to implement the steps of the method for log recording describe above.

One or more non-transitory computer-readable storage mediums storing a computer-readable instruction are further provided in an embodiment of the present disclosure, wherein the computer-readable instruction, when executed by one or more processors, causes the one or more processors to implement the steps of the method for log recording describe above.

Details of one or more embodiments of the present disclosure are provided in following drawings and description. Other features and advantages of the present disclosure may be apparent from the description, drawings and claims.

BRIEF DESCRIPTION OF THE DRAWINGS

In order to explain embodiments of the present disclosure or the technical schemes in the related art more clearly, the drawings required to be used in the description of the embodiments or the prior art may be briefly introduced below: obviously, the drawings in the following description are only some implementations of the present disclosure, and other drawings may be obtained according to these drawings by those of ordinary skill in the art without paying creative labor.

DETAILED DESCRIPTION

In the following, technical solutions in the present disclosure may be described clearly and completely in connection with the attached drawings: obviously, the described embodiments are a part of the embodiments of the present disclosure, but not all of the embodiments. On a basis of the embodiments in the present disclosure, all other embodiments obtained by the ordinary skilled in the art without any creative effort should be within a protection scope of the present disclosure. In addition, terms of "first", "second" and "third" are only used for descriptive purposes and cannot be understood as indicating or implying relative importance.

In addition, technical features involved in different embodiments of the present disclosure described below may be combined with each other as long as they do not conflict with each other.

In related art. NAND Flash media are generally adopted by the SSD in-disk system with the NVMe protocol interface as a storage area for log recording, and characteristics of log information of small data amount and no bandwidth performance requirements are considered, so use scenarios of non-anomalous power-off are generally considered in existing log recording solutions. However, the inventor has realized that SSD, as a data storage device, may also face a scenario of abnormal power-off, and a general practice is to design a capacitor for the SSD in-disk system in in-disk hardware design, and it is switched to supply power by using the capacitor when the system is abnormally powered off. During a period of supplying power by using the capacitor, the system saves important data to a flash memory through serial downloading, and the important data is resumed and reconstructed when it is powered on next time. Because available time for a log saving process is very short when the system is abnormally powered off, and it takes a long time for existing solutions of recording log data in the SSD by using a serial writing mode.

Figure 1:
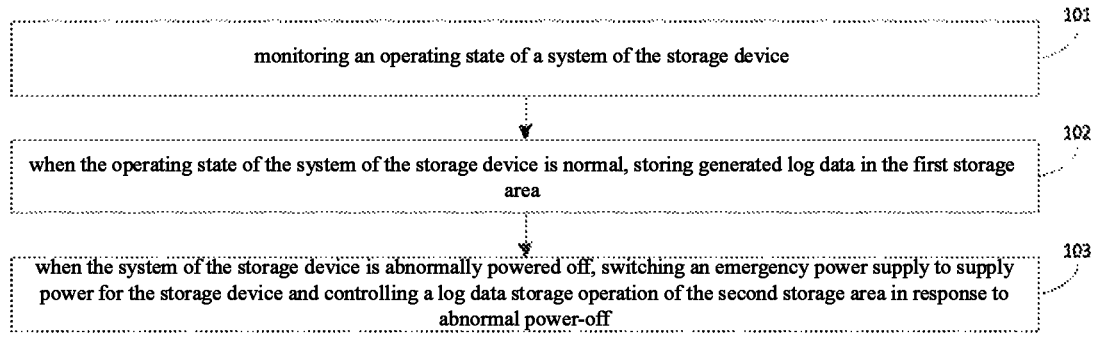
FIG. 1 is a flowchart of an embodiment of a method for log recording according to one or more embodiments of the present disclosure.

A method for log recording is provided in an embodiment of the present disclosure, which is applied to a storage device. A storage space of the storage device is configured to be at least two storage areas, and the at least two storage areas include at least one first storage area for storing data by using a serial writing mode and at least one second storage area for storing the data by using a parallel writing mode. As shown in FIG. 1, the method includes steps as follows:

Step 101, monitoring an operating state of a system of the storage device.

Step 102, when the operating state of the system of the storage device is normal, storing generated log data in the first storage area. The first storage area for storing data by using a serial writing mode is configured to store the log data in a normal operation state, which ensures that storage time of and a state indicating success or failure of storage of the log data in the normal operation state may be accurately determined, while log recording requirements of the system in a normal operation scenario may be met. As an embodiment of the present disclosure, this step 102 includes: storing the generated log data in a first caching area that is pre-configured; and when a preset caching condition is met, downloading the log data in the first caching area to a flash memory in the first storage area.

For example, a double data rate (DDR) storage area is configured in the storage device for caching the log data generated by the system, and the log data generated during the operation of the system is written into this caching area first, and then when the preset caching condition is met, the log data in the caching area is downloaded to the flash memory of the first storage area. The preset caching condition may be that the caching area is full or a caching duration reaches a preset duration, the preset caching condition is not limited in the embodiment of the present disclosure and may be determined by the skilled in the art according to actual needs.

Step 103, when the system of the storage device is abnormally powered off, switching an emergency power supply to supply power for the storage device and controlling a log data storage operation of the second storage area in response to abnormal power-off. For example, the emergency power supply may be a device that may temporarily supply power such as a capacitor. When it is monitored that the system of the storage device is abnormally powered off, the capacitor is switched to supply power, and important log data is stored in a second caching area during a period of supplying the power by the capacitor. The log data stored in the second storage area may include all information data that may be needed in a process of problem location, such as global variable information and stack data of the system, and the information data is stored in the second storage area by a predefined data structure.

In some embodiments, the operating state of the system of the storage device refers to the operating state of the storage device; and that the system of the storage device is abnormally powered off refers to that the storage device is abnormally powered off.

According to the method for log recording according to the embodiment of the present disclosure, the operating state of the system of the storage device is monitored, when the operating state of the system of the storage device is normal, the generated log data is stored in the first storage area; and when the system of the storage device is abnormally powered off, the emergency power supply is switched to supply power to the storage device, and a log data storage operation of the second storage area is controlled in response to abnormal power-off. By monitoring the operating state of the system of the storage device, when it is monitored that the system of the storage device is abnormally powered off, a serial writing mode of the log data under a normal condition is switched to be a parallel writing mode used by the second storage area for storing the data for the log data storage operation in response to abnormal power-off. Because the parallel writing mode is faster than the serial writing mode, the log data that may be used for locating fault information may be reliably stored in a limited time under the abnormal power-off of the system; and the log data generated in the normal operation state is still stored in the first storage area where the data is stored by using the serial writing mode. In this way, log recording requirements in the normal operation scenario of the system are ensured, while a log recording scheme in the normal scenario is prevented from being complicated due to existence of abnormal power-off scenarios.

As one or more embodiments of the present disclosure, the step 103 includes: when the system of the storage device is abnormally powered off, switching the emergency power supply to supply power for the storage device and responding to a timing operation; determining whether a power-off process of the system ends within a target duration; and when a power-off process of the system does not end within a target duration, storing the generated log data in the second storage area.

For example, the target duration may be determined according to a duration consumed by an abnormal power-off process of the system and an available duration of the emergency power supply, that is, when the system is abnormally powered off, a software program in the system may respond to the abnormal power-off process, and when the power-off process of the software program does not end within the target duration, system log data may be started to be collected and generated log data may be stored in the second storage area. The target duration is required to be set in a range of the available duration of the emergency power supply to ensure that remaining duration may be used for reliable storage of log data in case of abnormal power-off. For example, when the power-off process of the software program takes 10 ms and maximum duration for storing log data by using a parallel storage mode is 5 ms, the available duration of the equipped emergency power supply needs to meet at least 15 ms. When the power-off process of the system ends within the target duration, no processing is made. It is determined whether to respond to the log data storage during the abnormal power-off by setting the monitoring of the duration consumed by in the power-off process of the software program, redundant storage of log data under the abnormal power-off is avoided.

As one or more embodiments of the present disclosure, the step of storing the generated the log data in the second storage area includes: storing the generated log data in a second caching area that is pre-configured; and when a preset caching condition is met, downloading log data in the second caching area to a flash memory in the second storage area.

For example, for the log data storage in an abnormal state, a DDR storage area may also be similarly configured in the storage device for caching the log data generated by the system, and the log data generated under the abnormal power-off is written into this caching area first, and then when the preset caching condition is met, the log data in the caching area is downloaded to the flash memory of the second storage area. The preset caching condition may also be that the caching area is full or a caching duration reaches a preset duration, and the preset caching condition is not limited in the embodiment of the present disclosure and may be determined by the skilled in the art according to actual needs. The second storage area for caching the log data and the first storage area in the above embodiment may be one storage area, such as a shared DDR storage area, or a caching area may be respectively configured for storing log data in different operation scenarios. Since the mode of parallel downloading is used, it may be ensured that the log data in the caching area may be written into the flash memory in the limited time for persistent storage.

As one or more embodiments of the present disclosure, the method further includes: when the system of the storage device is powered on again, determining a processing result for previous power-off of the system of the storage device; and when the processing result for the previous power-off of the system of the storage device is abnormal, obtaining log data from the second storage area for performing abnormal power-off analysis.

For example, when the system is abnormally powered off, the interior of the program in the system may process the abnormal power-off according to a pre-configured processing program and store a processing result in the system. When the system is powered on again, the processing result of the previous power-off may be queried. When the queried processing result of the previous power-off of the system is abnormal, the log data may be obtained from the second storage area through a predefined interface for performing abnormal power-off analysis for locating the reason of the problem of the abnormal power-off process. When the queried processing result of the previous power-off of the system is normal, no processing is made.

As one or more embodiments of the present disclosure, the step of determining the processing result of the previous power-off of the system of the storage device includes: obtaining a programmed data saving result: obtaining mark data for the processing result for the previous power-off of the system of the storage device from the programmed data saving result; and determining the processing result for the previous power-off of the system of the storage device according to a type of the mark data.

For example, when the abnormal power-off is processed by using the pre-configured processing program, a processing result may be saved as programmed data, and a corresponding programmed data saving result may be obtained from a location where the programmed data is saved. The programmed data saving result may include the mark data of the processing result of the power-off of the system. For example, the mark of "0" indicates that the processing result is normal and the mark of "1" indicates that the processing result is abnormal, and the processing result for the previous power-off of the system of the storage device is determined by analyzing a marked result.

As one or more embodiments of the present disclosure, the step of determining the processing result for the previous power-off of the system of the storage device according to the type of the mark data includes: comparing the obtained mark data with data in a target database, wherein a correlation between the mark data and the processing result is pre-stored in the target database; and determining the processing result for the previous power-off of the system of the storage device according to a comparison result. For example, a way to determine the processing result of the power-off of the system according to different marked results may be to compare the obtained mark data with the target database stored with the correlation between the mark data and the processing result, and to determine the processing result for the previous power-off of the system of the storage device according to the comparison result.

Figure 2:
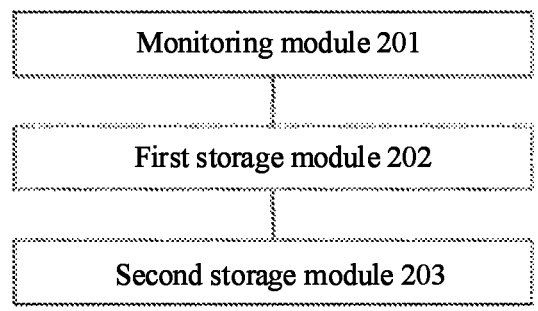
FIG. 2 is a schematic block diagram of an embodiment of an apparatus for log recording according to one or more embodiments of the present disclosure.

An apparatus for log recording is further provided in an embodiment of the present disclosure, which is configured to realize the embodiments and embodiments described above, and description which has been made may not be repeated here. As used below, a term "module" may be a combination of software and/or hardware that may implement a predetermined function. Although the apparatus described in following embodiments are implemented in software, implementation in hardware or a combination of software and hardware is also possible and contemplated. The apparatus for log recording is applied to a storage device. A storage space of the storage device is configured to be at least two storage areas, and the at least two storage areas include at least one first storage area for storing data by using a serial writing mode and at least one second storage area for storing the data by using a parallel writing mode. As shown in FIG. 2, the apparatus includes a monitoring module 201, a first storage module 202 and a second storage module 203.

The monitoring module 201 is configured for monitoring an operating state of a system of the storage device, which may be referred to the description of the step 101 in the above embodiment, and may not be repeatedly described here.

The first storage module 202 is configured for when the operating state of the system of the storage device is normal, storing generated log data in the first storage area, which may be referred to the description of the step 102 in the above embodiment, and may not be repeatedly described here.

The second storage module 203 is configured for when the system of the storage device is abnormally powered off, switching an emergency power supply to supply power for the storage device and controlling a log data storage operation of the second storage area in response to abnormal power-off, which may be referred to the description of the step 103 in the above embodiment, and may not be repeatedly described here.

According to the apparatus for log recording according to the embodiment of the present disclosure, the operating state of the system of the storage device is monitored, when the operating state of the system of the storage device is normal, the generated log data is stored in the first storage area; and when the system of the storage device is abnormally powered off, the emergency power supply is switched to supply power to the storage device, and at a log data storage operation of the second storage area is controlled in response to abnormal power-off. By monitoring the operating state of the system of the storage device, when it is monitored that the system of the storage device is abnormally powered off, a serial writing mode of the log data under a normal condition is switched to be a parallel writing mode used by the second storage area for storing the data for the log data storage operation in response to abnormal power-off. Because the parallel writing mode is faster than the serial writing mode, the log data that may be used for locating fault information may be reliably stored in a limited time of period under the abnormal power-off of the system; and the log data generated in the normal operation state is still stored in the first storage area where the data is stored by using the serial writing mode. In this way, log recording requirements in the normal operation scenario of the system are ensured, while a log recording scheme in the normal scenario is prevented from being complicated due to existence of abnormal power-off scenarios.

As one or more embodiments of the present disclosure, the second storage module 203 includes a switching sub-module configured for when the system of the storage device is abnormally powered off, switching the emergency power supply to supply power for the storage device and responding to a timing operation: a first determination sub-module configured for determining whether a power-off process of the system ends within a target duration; and a storage sub-module configured for when a power-off process of the system does not end within a target duration, storing the generated log data in the second storage area. Description of above corresponding embodiments may be referred for details, which may not be repeatedly described here.

As one or more embodiments of the present disclosure, the apparatus further includes: a determination module configured for when the system of the storage device is powered on again, determining a processing result for the previous power-off of the system of the storage device; and a data obtaining module configured for when the processing result for the previous power-off of the system of the storage device is abnormal, obtaining the log data from the second storage area for performing abnormal power-off analysis. Description of above corresponding embodiments may be referred for details, which may not be repeatedly described here.

As one or more embodiments of that disclosure, the determination module includes a first obtaining sub-module configured for obtaining a programmed data saving result; a second obtaining sub-module configured for obtaining mark data of the processing result for the previous power-off of the system of the storage device from the programmed data saving result; and a determination sub-module configured for determining the processing result for the previous power-off of the system of the storage device according to a type of the mark data. Description of above corresponding embodiments may be referred for details, which may not be repeatedly described here.

As one or more embodiments of the present disclosure, the second determination sub-module includes a comparison sub-module configured for comparing the obtained mark data with data in a target database, wherein a correlation between the mark data and the processing result is pre-stored in the target database; and determining the processing result for the previous power-off of the system of the storage device according to a comparison result. Description of above corresponding embodiments may be referred for details, which may not be repeatedly described here.

As one or more embodiments of the present disclosure, the first storage module includes a first caching sub-module configured for storing the generated log data into a first caching area that is pre-configured; and when a preset caching condition is met, downloading log data in the first caching area to a flash memory in the first storage area. Description of above corresponding embodiments may be referred for details, which may not be repeatedly described here.

As one or more embodiment of that disclosure, the storage sub-module includes a second caching sub-module configured for storing the generated log data into a second caching area that is pre-configured; and when a preset caching condition is met, downloading log data in the second caching area to a flash memory in the second storage area. Description of above corresponding embodiments may be referred for details, which may not be repeatedly described here.

Figure 3:
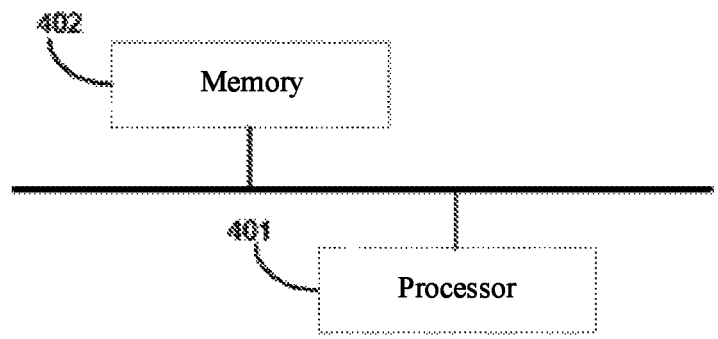
FIG. 3 shows an embodiment of an electronic device according to one or more embodiments of the present disclosure.

An electronic device is further provided in an embodiment of the present disclosure, as shown in FIG. 3, the electronic device may include a processor 401 and a memory 402. The processor 401 and the memory 402 may be connected by a bus or other means, and connection by a bus is taken as an example in FIG. 3.

The processor 401 may be a central processing unit (CPU). The processor 401 may also be other general-purpose processors, a digital signal processor (DSP), an application specific integrated circuits (ASIC), a field-programmable gate array (FPGA) or other programmable logic devices, discrete gate or transistor logic devices, discrete hardware components and other chips, or a combination of them.

As a non-transitory computer-readable storage medium, the memory 402 may be configured to store non-transitory software programs, non-transitory computer-executable programs and modules, such as program instructions/modules corresponding to the method for log recording in the embodiment of the present disclosure. The processor 401 performs various functional applications and data processing of the processor by executing non-transitory software programs, instructions and modules stored in the memory 402, that is, the method for log recording in the above embodiment is realized.

The memory 402 may include a storage program area and a storage data area. The storage program area may store an operating system and an application program required by at least one function; and the storage data area may store data created by the processor 401 and the like. In addition, the memory 402 may include a high-speed random access memory and may also include a non-transitory memory, such as at least one disk memory device, flash memory device, or other non-transitory solid-state memory device. In some embodiments, the memory 402 may include memories remotely set with respect to the processor 401, and these remote memories may be connected to the processor 401 through a network. Embodiments of the above network include, but are not limited to, the Internet, an enterprise intranet, a local area network, a mobile communication network, and combinations thereof.

One or more memories 402 are configured to store computer-readable instructions.

The processor 401 is configured to execute the computer-readable instruction described above, and the computer-readable instruction is executed by the processor 401 to implement steps of the method for log recording in any one of the above embodiments.

A non-transitory computer-readable storage medium is further provided in an embodiment of the present disclosure. Computer-readable instructions are stored in the non-volatile computer-readable storage medium, and when the computer-readable instructions are executed by one or more processors, the steps of the method for log recording disclosed in any of the above embodiments may be realized.

Details of the electronic device described above may be understood by referring to corresponding related description and effect in the embodiment shown in FIG. 1, which may not be repeatedly described here.

It may be understood by those skilled in the art that related hardware may be instructed by computer-readable instructions to realize all or a part of processes in the method in the above embodiments, and the computer-readable instructions may be stored in non-transitory computer-readable storage medium, and when executed, the computer-readable instructions may involve processes of the embodiments of the methods described above. Any reference to a memory, a storage, a database or other media used in the embodiments provided in the present disclosure may include a nonvolatile and/or volatile memory. The nonvolatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external buffer memory. By way of illustration but not limitation, the RAM is available in various forms, such as a static RAM (SRAM), dynamic RAM (DRAM), a synchronous DRAM (SDRAM), a double data rate SDRAM (DDRSDRAM), an enhanced SDRAM (ESDRAM), a synchronous link DRAM (SLDRAM), a memory bus (Rambus) direct RAM (RDRAM), and a direct memory bus dynamic RAM (DRDRAM), and a memory bus dynamic RAM (RDRAM), or the like.

Respective technical features of the above embodiments may be combined arbitrarily. In order to make the description concise, not all possible combinations of the technical features in the above embodiments are described. However, as long as there is no contradiction between the combinations of these technical features, they should be considered to be within the scope recorded in this specification.

The above embodiments only provides several implementations of the present disclosure, with more detailed descriptions, but they cannot be understood as limitations on the scope of patent disclosure. It should be noted that several modifications and improvements may be made by those skilled in the art without departing from the concept of the present disclosure, which are within the protection scope of the present disclosure. Therefore, the protection scope of the present disclosure shall be subject to the appended claims.

The invention claimed is:

1. A method for log recording applied to a storage device, wherein, a storage space of the storage device has at least two storage areas, and the at least two storage areas comprises at least one first storage area for storing data by using a serial writing mode and at least one second storage area for storing the data by using a parallel writing mode, the method comprises:
monitoring an operating state of a system of the storage device;
in response to the operating state of the system of the storage device being normal, storing generated log data in the first storage area; and
in response to the system of the storage device being abnormally powered off, switching an emergency power supply to supply power for the storage device and controlling a log data storage operation of the second storage area in response to abnormal power-off;
wherein in response to the system of the storage device being abnormally powered off, switching the emergency power supply to supply power for the storage device and controlling the log data storage operation of the second storage area in response to the abnormal power-off comprises:
in response to the system of the storage device being abnormally powered off, switching the emergency power supply to supply power for the storage device and responding to a timing operation; and
in response to a power-off process of the system being not completed within a target duration, storing the generated log data in the second storage area.

2. The method according to claim 1, wherein the target duration is determined according to a duration consumed by an abnormal power-off process of the system and an available duration of the emergency power supply.

3. The method according to claim 1, wherein the method further comprises:
in response to the system of the storage device being powered on again, determining a processing result for previous power-off of the system of the storage device; and
in response to the processing result for the previous power-off of the system of the storage device being abnormal, obtaining log data from the second storage area for performing abnormal power-off analysis.

4. The method according to claim 3, wherein the method further comprises:
in response to the processing result for the previous power-off of the system of the storage device being normal, performing no processing.

5. The method according to claim 3, wherein the step of determining the processing result for previous power-off of the system of the storage device comprises:
obtaining a programmed data saving result;
obtaining mark data of the processing result for the previous power-off of the system of the storage device from the programmed data saving result; and
determining the processing result for the previous power-off of the system of the storage device according to a type of the mark data.

6. The method according to claim 5, wherein the step of determining the processing result for the previous power-off of the system of the storage device according to the type of the mark data comprises:
comparing the obtained mark data with data in a target database, wherein a correlation between the mark data and the processing result is pre-stored in the target database; and
determining the processing result for the previous power-off of the system of the storage device according to a comparison result.

7. The method according to claim 1, wherein the step of in response to the operating state of the system of the storage device being normal, storing the generated log data in the first storage area comprises:
storing the generated log data in a first caching area that is pre-configured; and
in response to a preset caching condition being met, downloading log data in the first caching area to a flash memory in the first storage area.

8. The method according to claim 7, wherein the preset caching condition is that the first caching area is full or a caching duration reaches a preset duration.

9. The method according to claim 7, wherein the step of storing the generated log data in the first caching area that is pre-configured comprises:
configuring a double data rate (DDR) storage area in the storage device, wherein the DDR storage area is configured for caching the log data generated by the system.

10. The method according to claim 1, wherein the step of storing the generated log data in the second storage area comprises:
storing the generated log data in a second caching area that is pre-configured; and
in response to a preset caching condition being met, downloading log data in the second caching area to a flash memory in the second storage area.

11. The method according to claim 10, wherein the log data comprises all information data that is needed in a process of problem location.

12. The method according to claim 11, wherein the information data comprises global variable information and/or stack data of the system.

13. The method according to claim 12, wherein the information data is stored in the second storage area by a predefined data structure.

14. The method according to claim 1, wherein the emergency power supply is a temporary power supply device.

15. The method according to claim 14, wherein the emergency power supply is a capacitor.

16. An electronic device, comprising a memory and one or more processors, wherein a computer-readable instruction is stored in the memory, and the computer-readable instruction, in response to being executed by the one or more processors, causes the one or more processors to implement the steps of the method for log recording according to claim 1.

17. One or more non-transitory computer-readable storage mediums storing a computer-readable instruction, wherein the computer-readable instruction, in response to being executed by one or more processors, causes the one or more processors to implement the steps of the method for log recording according to claim 1.

18. The method according to claim 1, wherein the first storage area and the second storage area share a DDR storage area.

* * * * *